Patented Mar. 9, 1943

2,313,053

UNITED STATES PATENT OFFICE 2,313,053

CATALYST AND PREPARATION THEREOF

Martin de Simó, Piedmont, and Frank Matthew McMillan and Harry Ashley Cheney, Berkeley, Calif., assignors to Shell Development Company, San Francisco, Calif., a corporation of Delaware No Drawing. Application August 15, 1939, Serial No. 290,256

10 Claims. (Cl. 252—205)

The present invention relates to new and improved catalysts and their preparation.

An object of the invention is to provide new and superior aluminum halide combination catalysts having greater catalytic activity, longer catalytic life, and/or high mechanical strength. A more particular object of the invention is to provide new, improved promoted aluminum chloride catalysts, which are especially suitable for catalyzing hydrocarbon reactions.

The aluminum halides, as is known, have valuable catalytic properties and find wide application in hydrocarbon reactions. In most cases the aluminum halide is simply suspended in the reaction mixture, preferably with stirring. In some cases, especially when effecting the reaction in the vapor phase, the aluminum halide is combined with a carrier or supporting material, such as pumice, activated charcoal, and the like, which gives the catalyst a fixed physical shape and provides a greater catalytic surface. These supported catalysts are usually prepared by simply mixing pieces of carrier material with the fine powdered aluminum halide whereupon the carrier material becomes impregnated to a certain extent and the surface well covered. Another method for producing supported aluminum halide catalysts, which has the advantage of allowing the aluminum halide content to be varied over a wide range, is to press or mold suitable mixtures containing the desired amount of aluminum halide. Thus, for example, aluminum chloride is thoroughly mixed with a suitable powdered carrier and the homogeneous mixture pressed into pills, rings, or other suitable forms.

It has now been found that catalytic materials having vastly superior properties are obtained by combining an aluminum halide, and especially aluminum chloride, with suitable carriers or supporting materials in an entirely different manner. According to the process of the present invention, a mixture of aluminum chloride and a suitable catalyst carrier is heated while under superatmospheric pressure at a temperature sufficiently high to melt the aluminum chloride (about 190° C.). The catalytic mass obtained upon cooling is then preferably crushed or broken into fragments of the desired sizes. The catalysts produced by this simple procedure are quite different than the impregnated catalysts prepared by the older methods and possess very valuable and unexpected properties and characteristics.

One of the advantageous characteristics of the present catalysts, which is of utmost importance, is their increased catalytic activity. This increased catalytic activity is very pronounced in some cases and less so in others and depends primarily upon the particular material with which the aluminum chloride is combined. Since the catalysts to which the invention relates are, in general, much more effective than catalysts of the same composition prepared by the conventional methods, it is apparent that the more active catalysts of the present invention are true catalyst combinations and that the increased catalytic activity of these more active catalysts is due to a promoting effect which is materially enhanced by the present method of preparation.

An important advantageous characteristic of the present catalysts is their superior mechanical strength. Due to the superior properties of the present catalysts in this respect, they can be employed in larger, more economically employed beds. They also suffer much less disintegration during use and, consequently, can be used for much longer periods of time before the efficiency of the bed becomes severely impaired by channeling, etc., due to disintegration.

The preferred materials to be combined with aluminum chloride, according to the present invention, are the various siliceous and/or aluminous materials of natural or synthetic origin which may contain an appreciable amount of firmly-bound or strongly-adsorbed water. Suitable materials of this category are, for example, the natural-occurring minerals and clays, such as pipe clay, bauxite, fuller's earth, bentonite, kaolin, Florida earth, meerschaum, infusorial earth, kieselguhr, diatomaceous earth, montmorillonite, the permutites, and the like; the various treated clays and clay like materials, such as "Tonsil," "Celite," "Sil-O-Cel," "Terrana," and the like; and artificially prepared materials, such as "Activated Alumina," the artificial permutites, and the like. These materials are preferably, but not necessarily, partially dehydrated by heating in a dry atmosphere at a temperature somewhat higher than that at which they are to be employed, for instance, at about 200° C. to 400° C., until they substantially cease to give off water. Of these materials and similar materials of this category, "Activated Alumina" and the diatomaceous earth, such as "Sil-O-Cel," are found to be particularly effective. "Activated Alumina" and "Sil-O-Cel" herein refer to the well-known materials of commerce. "Activated Alumina" is prepared according to the methods of United States Patents 1,868,869 and 2,015,593.

Although materials of the above class, in general, produce the most active catalysts, any of the other common catalyst carriers or supporting material such, for instance, as activated charcoal, crushed coke, crushed brick, pumice, porcelain chips, majolica chips, chamotte, asbestos, and the like may also be used, if desired. The most important advantage afforded by these latter materials is their high mechanical strength and low cost. While they may be used alone, they are most advantageously used in conjunction with one or more of the above-mentioned more active materials.

The carrier material to be combined with the aluminum chloride may be in the form of small broken pieces or as a fine powder and may be employed either singly or in admixture with one another. Thus, for example, excellent catalysts of high mechanical strength and low cost may be prepared by employing a mixture of anhydrous aluminum chloride, powdered "Sil-O-Cel" brick, and 8 to 10 mesh pumice.

For the preparation of the present catalyst any substantially anhydrous aluminum chloride, such as the powdered commercial product, may be used. For many hydrocarbon reactions, especially at elevated temperatures, it is found that catalysts prepared from aluminum chloride, containing an appreciable quantity of iron chloride, are much inferior. It has been found that the deleterious effect of the iron may be overcome and that excellent catalysts may be prepared from aluminum chloride contaminated with iron chloride if a small amount of metallic aluminum is added to the catalyst mixture prior to heating. The amount of aluminum required depends upon the amount of iron present in the aluminum chloride and is generally quite small. For example, 1% or less of the metal, preferably employed in a finely divided form, usually suffices but somewhat larger quantities may also be used. It is also advantageous to employ an aluminum-lined container when preparing the catalyst.

Although, according to the present process, catalysts may be prepared containing almost any desired concentration of aluminum chloride, catalysts containing from about 25% to about 90% of aluminum chloride have, in general, superior mechanical strength and are preferred. Since the aluminum chloride is preferably employed in sufficient quantity to produce a mass which upon cooling may be broken up into pieces of the desired size, it is, therefore, preferable, in such cases where a catalyst of low aluminum chloride content is desired, to choose a carrier material having a low absorption capacity such, for instance, as crushed 8 to 10 mesh bauxite. In preparing catalysts containing very high concentrations of aluminum chloride such, for instance, as above 80 to 90%, a finely divided and highly absorbent carrier material such, for instance, as powdered bentonite, kieselguhr, etc. may be more preferably used.

The aluminum chloride and carrier material, preferably well mixed, are heated at a temperature of at least 190° C. (for instance, at from 200° C. to about 300° C.) under a pressure of preferably at least 40 pounds per square inch. In the practical application of the process excellent results may be obtained, for example, using pressures varying from about 100 to about 800 pounds per square inch. Pressures of 1000 pounds per square inch or higher may, of course, also be employed but require more expensive equipment. The vapor pressure of the aluminum chloride may be supplemented by air, $N_2$, $CO_2$, $H_2$, HCl or the like. After heating the mixture as above described for a few minutes or longer, the catalyst mixture may be handled in either one of two ways. If it is desired to produce a catalyst of the maximum mechanical strength, the mass is solidified by cooling, the pressure released, and the solid mass removed from the vessel and broken up into fragments of any desired size. The products prepared in this manner are, in general, mechanically strong, solid fragments of catalysts having high catalytic activity.

According to a preferred embodiment of the invention, a porous catalyst, which, besides having excellent mechanical strength and high catalytic activity, also exhibits a maximum surface and light weight, is prepared. In order to produce catalysts of this type, the catalyst mass under pressure is caused to swell or rise by decreasing the pressure prior to solidification. By varying the amount of pressure drop and the temperature at which the pressure is released, it is possible to produce catalysts of varying degrees of porosity. The catalysts prepared according to this preferred embodiment offer a much larger contact surface and are consequently more efficient and economical.

The grading of the catalyst, i. e. the crushing, sieving, etc., is preferably executed in a dry atmosphere. In any grading operation there are, invariably, a certain amount of "fines" produced. These fines are not wasted, according to the present process, since they may be reutilized in the preparation of the next batch of catalyst. Thus, it is seen that according to the present process a complete yield of catalysts having superior catalytic activity, high porosity, excellent mechanical strength and the optimum particle size for the purpose at hand, may be easily prepared in a practical and economical manner.

The present catalysts, due to their excellent mechanical strength, large available surface, and high catalytic activity, are especially suited for catalyzing hydrocarbon reactions, such as isomerization, alkylation, polymerization and cracking. When employed, for example, in catalytic chambers in vapor phase reactions, they remain active for long periods of time without noticeable disintegration or channeling.

The following examples, which are not to be construed as limitative, illustrate the catalysts of the present invention, their preparation, and their use:

*Example I*

Two parts by weight of powdered anhydrous aluminum chloride were mixed with one part of "Activated Alumina" previously crushed to 150 to 200 mesh and dried for two hours at 300° C. The mixture was placed in a pressure vessel equipped with heating means, the vessel closed, nitrogen introduced, and the whole heated to about 210° C. After heating for a time at a pressure of about 300 pounds per square inch, the mixture was gradually cooled and the pressure released prior to solidification, whereupon the mass swelled, or rose, and solidified into a hard porous cake. Upon crushing the cake and grading, an excellent catalyst of uniform composition and particle size, large surface area, high mechanical strength, low apparent density and low cost, was obtained.

Example II

Normal butane vapor containing a small amount of HCl was passed at various rates at 11 atmospheres pressure through a reaction tube filled with a catalyst prepared as described in Example I and maintained at only 100° C. The following conversions to isobutane were obtained:

| Space velocity $\frac{\text{(mols)}}{\text{(liter) (hr.)}}$ | Conversion percent N-butane converted to isobutane |
|---|---|
| 0.9 | 64 |
| 5.8 | 54 |

Example III

Normal butane vapor containing a small amount of HCl was passed at a space velocity of 5.4 mols per liter per hour and 150 pounds per square inch through a catalytic chamber filled with a catalyst prepared as described in Example I and maintained at 100° C. At the beginning, the conversion of normal butane to isobutane was about 46% to 48%. At the end of 318 hours of continuous operation, the conversion of normal butane to isobutane was still about 45%, and the catalyst showed no indication of exhaustion.

We claim as our invention:

1. The process for the preparation of improved aluminum chloride catalysts especially suited for catalyzing hydrocarbon reactions which comprises mixing a finely divided partially hydrated solid carrier material with a sufficient amount of anhydrous aluminum chloride to form a solid cake upon fusing and solidifying, fusing the aluminum chloride in said mixture at a temperature of at least 190° C. under a pressure of at least 40 pounds per square inch, solidifying the mixture by cooling, and crushing the resulting catalyst mass into irregular fragments.

2. The process for the preparation of improved aluminum chloride catalysts which comprises mixing a diatomaceous earth with a sufficient amount of anhydrous aluminum chloride to form a solid cake upon fusing and solidifying, fusing the aluminum chloride in said mixture at a temperature of at least 190° C. under a pressure of at least 40 pounds per square inch, solidifying the mixture by cooling, and crushing the resulting catalyst mass into irregular fragments.

3. The process for the preparation of improved aluminum chloride catalysts which comprises mixing a finely divided activated alumina made by partial dehydration of alumina alpha trihydrate precipitated from an alkaline aluminate solution with a sufficient amount of anhydrous aluminum chloride to form a solid cake upon fusing and solidifying, fusing the aluminum chloride in said mixture at a temperature of at least 190° C. under a pressure of at least 40 pounds per square inch, solidifying the mixture by cooling, and crushing the resulting catalyst mass into irregular fragments.

4. The process for the preparation of improved aluminum chloride catalysts which comprises mixing a finely divided partially hydrated solid carrier material with a sufficient amount of anhydrous aluminum chloride to form a solid cake upon fusing and solidifying, fusing the aluminum chloride in said mixture at a temperature of at least 190° C. under a pressure of at least 40 pounds per square inch, cooling the mixture and swelling the mixture just prior to solidification by reducing the pressure, solidifying and crushing the resulting porous catalyst mass into irregular fragments.

5. A process for the preparation of improved aluminum chloride catalysts which comprises mixing a finely divided activated alumina made by partial dehydration of alumina alpha trihydrate precipitated from an alkaline alumina solution with a sufficient amount of anhydrous aluminum chloride to form a solid cake upon fusing and solidifying, fusing the aluminum chloride in said mixture at a temperature of at least 190° C. under a pressure of at least 40 pounds per square inch, cooling the mixture and swelling the mixture just prior to solidification by reducing the pressure, solidifying and crushing the resultant porous catalyst mass into irregular fragments.

6. Aluminum chloride catalyst prepared according to the method of claim 4.

7. Aluminum chloride catalyst prepared according to the method of claim 5.

8. A solid catalyst especially suitable for catalyzing hydrocarbon reactions comprising fragments of fused and solidified aluminum chloride containing particles of a partially hydrated mineral catalyst carrier material embedded therein.

9. A solid catalyst especially suitable for catalyzing hydrocarbon reactions comprising fragments of fused and solidified aluminum chloride containing particles of an activated alumina made by partial dehydration of alumina alpha trihydrate precipitated from an alkaline aluminate solution embedded therein.

10. A solid catalyst especially suitable for catalyzing hydrocarbon reactions comprising fragments of fused and solidified aluminum chloride containing particles of diatomaceous earth embedded therein.

MARTIN DE SIMÓ.
FRANK MATTHEW McMILLAN.
HARRY ASHLEY CHENEY.